United States Patent
Kotake et al.

(10) Patent No.: US 11,112,502 B2
(45) Date of Patent: Sep. 7, 2021

(54) LASER RADAR SYSTEM

(71) Applicant: Mitsubishi Electric Corporation, Tokyo (JP)

(72) Inventors: Nobuki Kotake, Tokyo (JP); Shumpei Kameyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 567 days.

(21) Appl. No.: 16/078,256

(22) PCT Filed: Apr. 5, 2016

(86) PCT No.: PCT/JP2016/061086
§ 371 (c)(1),
(2) Date: Aug. 21, 2018

(87) PCT Pub. No.: WO2017/175297
PCT Pub. Date: Oct. 12, 2017

(65) Prior Publication Data
US 2019/0064361 A1    Feb. 28, 2019

(51) Int. Cl.
G01S 17/00    (2020.01)
G01S 17/58    (2006.01)
(Continued)

(52) U.S. Cl.
CPC ............ *G01S 17/58* (2013.01); *G01S 7/4818* (2013.01); *G01S 17/95* (2013.01); *G01S 7/02* (2013.01); *Y02A 90/10* (2018.01)

(58) Field of Classification Search
USPC ....................................................... 356/28
See application file for complete search history.

(56) References Cited

U.S. PATENT DOCUMENTS

| | | | |
|---|---|---|---|
| 10,379,136 B2* | 8/2019 | Kotake | G01S 17/86 |
| 2014/0300888 A1* | 10/2014 | Duffey | G01S 17/95 |
| | | | 356/28 |

(Continued)

FOREIGN PATENT DOCUMENTS

| | | |
|---|---|---|
| JP | 2009-162678 A | 7/2009 |
| JP | 2009-300133 A | 12/2009 |

(Continued)

OTHER PUBLICATIONS

International Search Report issued in PCT/JP2016/061086 (PCT/ISA/210), dated Jun. 21, 2016.

*Primary Examiner* — James R Hulka
(74) *Attorney, Agent, or Firm* — Birch, Stewart, Kolasch & Birch, LLP

(57) ABSTRACT

In conventional laser radar systems, the wind velocity measurement accuracy cannot be improved without changing their time gate widths, which is a problem.
A laser radar system according to the present invention includes: an optical oscillator to perform laser light oscillation; an optical modulator to modulate the laser light by oscillation of the optical oscillator; an optical antenna to emit the laser light modulated by the optical modulator into the atmosphere and to receive scattered light from an irradiated target as reception light; an optical receiver to perform heterodyne detection on the reception light received by the optical antenna; and a signal processor to calculate a spectrum of a reception signal obtained by the optical receiver's performing heterodyne detection, to decompose the spectrum using signal-to-noise ratios, and to calculate a velocity of an irradiated target from a decomposed spectrum.

5 Claims, 11 Drawing Sheets

(51) Int. Cl.
  *G01S 17/95* (2006.01)
  *G01S 7/481* (2006.01)
  *G01S 7/02* (2006.01)

(56) References Cited

U.S. PATENT DOCUMENTS

| | | | | |
|---|---|---|---|---|
| 2018/0356440 | A1* | 12/2018 | Kotake | G01S 17/86 |
| 2020/0064485 | A1* | 2/2020 | Kotake | G01S 17/87 |
| 2020/0309950 | A1* | 10/2020 | Imaki | G01S 17/95 |
| 2021/0011141 | A1* | 1/2021 | Kotake | G01S 17/58 |
| 2021/0157000 | A1* | 5/2021 | Imaki | G01S 7/4815 |

FOREIGN PATENT DOCUMENTS

| | | |
|---|---|---|
| JP | 2010-271058 A | 12/2010 |
| JP | 2012-18154 A | 1/2012 |
| JP | 2012-18155 A | 1/2012 |
| JP | 2013-124971 A | 6/2013 |
| JP | 2014-44193 A | 3/2014 |

\* cited by examiner

LASER RADAR SYSTEM

TECHNICAL FIELD

The present invention relates to a laser radar system.

BACKGROUND ART

There is a known laser radar system to obtain wind velocity by emitting laser light into the atmosphere and receiving the scattered light reflected by liquid or solid fine particles floating in the atmosphere (aerosol). This laser radar system can be used, for example, for wind condition assessment and wind turbine evaluation. High resolution and high accuracy measurement of wind velocity distribution within the rotation radius of a wind turbine makes it possible to provide detailed feedback on the designs of wind turbines as well as to detect anomaly in a wind turbine. A conventional laser radar system shown in Patent Document 1 obtains frequency spectrum in each time width of the scattered light reflected by fine particles in atmospheric aerosol by performing Fourier transform on the scattered light for each time gate. Next, the frequency spectrums of the time widths are integrated to obtain the radial wind velocity from the peak value of the integrated frequency spectrum. Then, by gathering the radial wind velocities for lines of sight, each of which is obtained from their integrated frequency spectrum, the wind vector is calculated.

REFERENCES CITED

Patent Documents

Document 1: Unexamined Patent Application Publication Number JP, 2009-300133

SUMMARY OF THE INVENTION

Technical Problems

Since the conventional laser radar system has a constant width of time gates, each of the time gates includes signals of various wind velocities.

FIG. 11 is an illustration showing wind turbine evaluation using a conventional radar system. In a case of evaluation of a wind turbine as shown in FIG. 11, wind velocity within the rotating radius of the wind turbine changes from height to height. However, only the mean of the wind velocities or the mode thereof is provided as an output for each range-bin (i.e., time gate). This means the frequency spectrum obtained in each range-bin is broadened, so that the wind velocity measurement accuracy is not improved, which is a problem to be solved. In order to improve measurement accuracy of the wind velocity, it is necessary to narrow the spatial resolution of measurement, in other words, to make the time gate narrower. In that case, however, the signal intensity available becomes weak, so that the peak value ratio to the noise, or the signal to noise ratio (SNR) deteriorates. This leads to a short distance observation range. That is, the time gate width and the wind velocity measurement accuracy are in a trade-off relation. Both are not satisfied at the same time.

Solution to Problems

A laser radar system according to the present invention includes: an optical oscillator to perform laser light oscillation; an optical modulator to modulate the laser light by oscillation of the optical oscillator; an optical antenna to emit the laser light modulated by the optical modulator into the atmosphere and to receive scattered light from an irradiated object as reception light; an optical receiver to perform heterodyne detection on the reception light received by the optical antenna; and a signal processor to calculate a spectrum of a reception signal obtained by the optical receiver's performing heterodyne detection, to decompose the spectrum using signal-to-noise ratios, and to calculate a velocity of an irradiated object from a decomposed spectrum, where the signal processor includes: a range bin divider to divide the reception signal at intervals of a preset width of time gates; a Fourier transform processor to perform Fourier transform on a reception signal divided by the range bin divider and to calculate a spectrum of the reception signal for each of the time gates; an integrator to integrate spectrums calculated by the Fourier transform processor for each of the time gates; an SNR calculator to obtain the signal-to-noise ratio for a target distance from the spectrum integrated by the integrator; a number-of-decomposition setter to set the number of segments for the spectrum integrated by the integrator to be decomposed; a spectrum decomposer to decompose the spectrum integrated by the integrator by using the number of segments set by the number-of-decomposition setter and the signal-to-noise ratios calculated by the SNR calculator; and a wind velocity calculator to calculate a wind velocity of the irradiated object from a spectrum decomposed by the spectrum decomposer.

Advantages of the Invention

According to the present invention, the wind velocity measurement accuracy of a laser radar system is improved without changing the time gate width.

DESCRIPTION OF EMBODIMENTS

Embodiment 1

Figure 1:
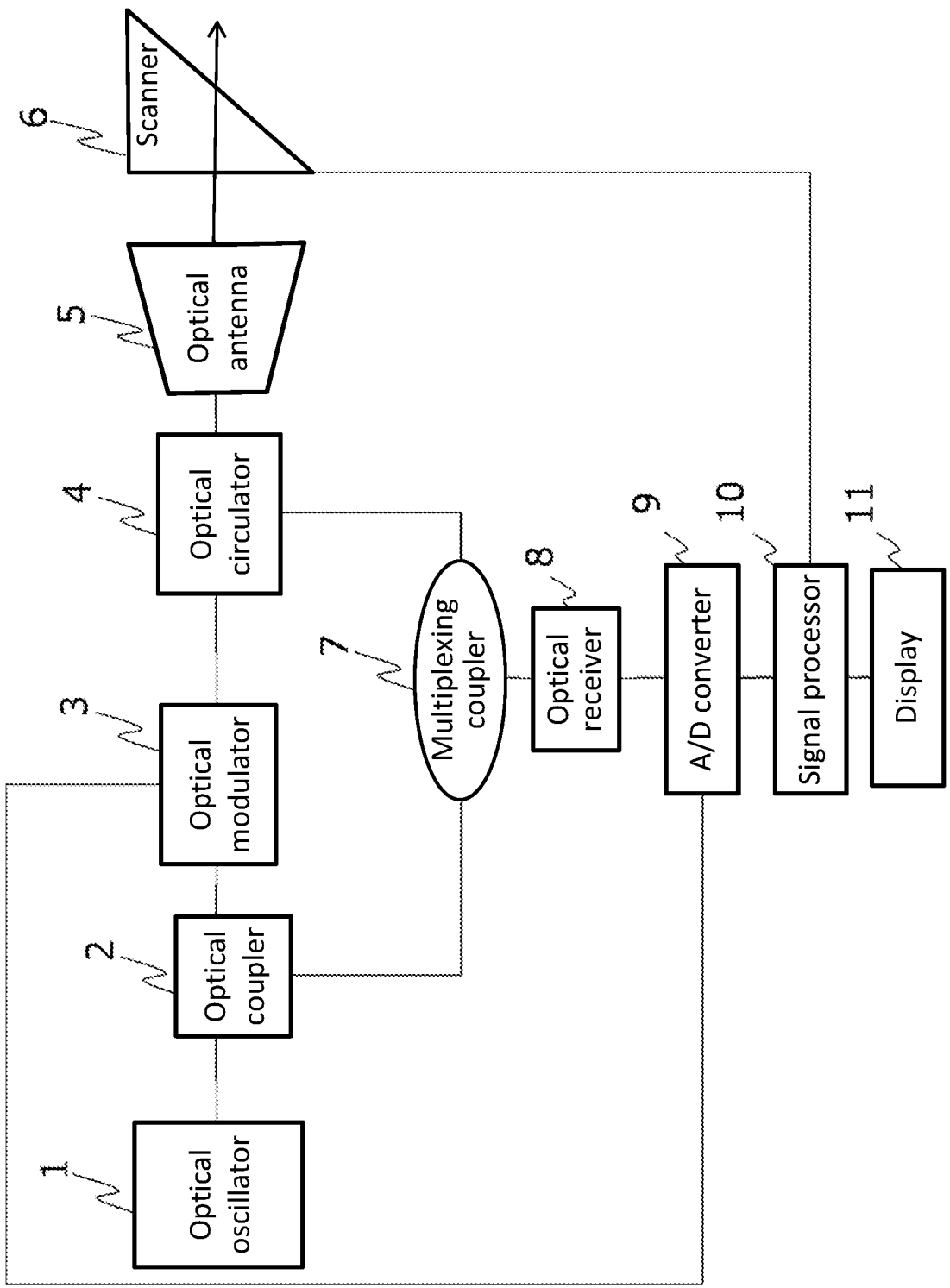
FIG. 1 is a diagram showing a configuration example of a laser radar system according to Embodiment 1 of the present invention.

FIG. 1 is a diagram showing a configuration example of a laser radar system according to Embodiment 1 of the present invention.

The laser radar system includes an optical oscillator 1, an optical coupler 2, an optical modulator 3, an optical circulator 4, an optical antenna 5, a scanner 6, a multiplexing coupler 7, an optical receiver 8, an A/D converter 9, a signal processor 10, and a display 11.

The optical oscillator 1 is an optical oscillator to perform laser light oscillation. The optical oscillator 1 is connected to the optical coupler 2, where the output thereof, the laser light by oscillation, is fed into the optical coupler 2. A semiconductor laser or a solid state laser, for example, is used for the optical oscillator 1.

The optical coupler 2 is an optical coupler to split the laser light, which is an output of the optical oscillator 1, into local light and transmission light. The local light is light to pass through the path that connects the optical coupler 2 to the optical receiver 8 via the multiplexing coupler 7, while the transmission light is light to pass through the path that connects the optical coupler 2 to the optical antenna 5 via the optical modulator 3. The optical coupler 2 is connected to the optical oscillator 1, the optical modulator 3, and the multiplexing coupler 7. One output thereof, the local light, is fed into the multiplexing coupler 7 and the other output, the transmission light, is fed into the optical modulator 3. For the optical coupler, for example, a fused fiber coupler or a filter type coupler with a dielectric multilayer filter is used.

The optical modulator 3 is a modulator to shift frequency of the transmission light which is an output of the optical coupler 2. The optical modulator 3 performs phase modulation or frequency modulation on the transmission light to shift the frequency thereof. The optical modulator 3 is connected to the optical coupler 2 and the optical circulator 4. For the optical modulator 3, for example, an acousto-optic frequency shifter or an optical phase modulator is used.

The optical circulator 4 is an optical circulator to isolate the reception light, which is received through the scanner 6 and the optical antenna 5, from the transmission light, which is modulated by the optical modulator 3. The reception light here is the scattered light of the transmission light from the aerosol. The optical circulator 4 is connected to the optical modulator 3, the optical antenna 5, and the multiplexing coupler 7. One output thereof, the transmission light, is fed into the optical antenna 5 and the other output, the reception light, is fed into the multiplexing coupler 7. For the optical circulator 4, for example, a space propagation type or an optical fiber coupling type circulator is used, where it includes a wave plate and a beam splitter.

The optical antenna 5 is an optical antenna to emit, as output thereof, the transmission light which is an output of the optical circulator 4. It also receives, as the reception light, the scattered light from the aerosol. The optical antenna 5 is connected to the optical circulator 4 and the scanner 6, where one output thereof, the transmission light, is fed into the scanner 6 and the other output, the reception light, is fed into the optical circulator 4. For the optical antenna 5, for example, an optical telescope or a camera lens is used.

The scanner 6 is a scanner for beam steering of the transmission light, which is an output of the optical antenna 5. It steers pointing direction (also referred to as radial direction) of the beam into the atmosphere. The scanner 6 includes a wedge prism, a motor to rotate it, and an encoder. For the motor, for example, a stepping motor with an encoder is used. The scanner 6 rotates the motor at a given rotation speed to steer the radial direction regarding the wedge prism. It also sends, to the signal processor 10, pointing angle information of the transmission light. For the scanner 6, for example, a wedge prism mirror or a galvanometer scanner is used.

The multiplexing coupler 7 is a multiplexing coupler to combine the local light and the reception light. The multiplexing coupler 7 is connected to the optical coupler 2, the optical circulator 4, and the optical receiver 8. The multiplexing coupler 7 combines the local light, which is an output of the optical coupler 2, with the reception light, which is an output of the optical circulator 4. The output thereof, the combined light, is fed into the optical receiver 8. For the multiplexing coupler 7, for example, a fused fiber coupler or a filter type coupler with a dielectric multilayer filter is used.

The optical receiver 8 is an optical receiver to perform heterodyne detection on the combined light, which is the output of the multiplexing coupler 7. The optical receiver 8 is connected to the multiplexing coupler 7 and the A/D converter 9. The optical receiver 8 performs heterodyne detection on the combined light, which is the output of the multiplexing coupler 7, converts the detected optical signal into an electric signal, and sends the electric signal to the A/D converter 9. For the optical receiver 8, for example, a balanced receiver is used.

The A/D converter 9 is an A/D converter (Analogue to Digital converter) to convert the analog signal that the optical receiver 8 received by heterodyne detection into digital signal data. The A/D converter 9 is connected to the optical receiver 8, the optical modulator 3, and the signal processor 10. The A/D converter 9 performs sampling on the analog electric signal which is an output of the optical receiver 8 by using triggers of laser pulse trigger signals which are outputs of the optical modulator 3 to convert the analog signal to digital signal data, which is fed into the signal processor 10 as an output thereof. For the A/D converter 9, for example, a double-integrating type A/D converter, a successive-approximation A/D converter, or a parallel comparator A/D converter is used.

The signal processor 10 is a signal processor to perform signal processing of the digital signal data, which is an output of the A/D converter 9, to calculate the wind vector.

Figure 2:
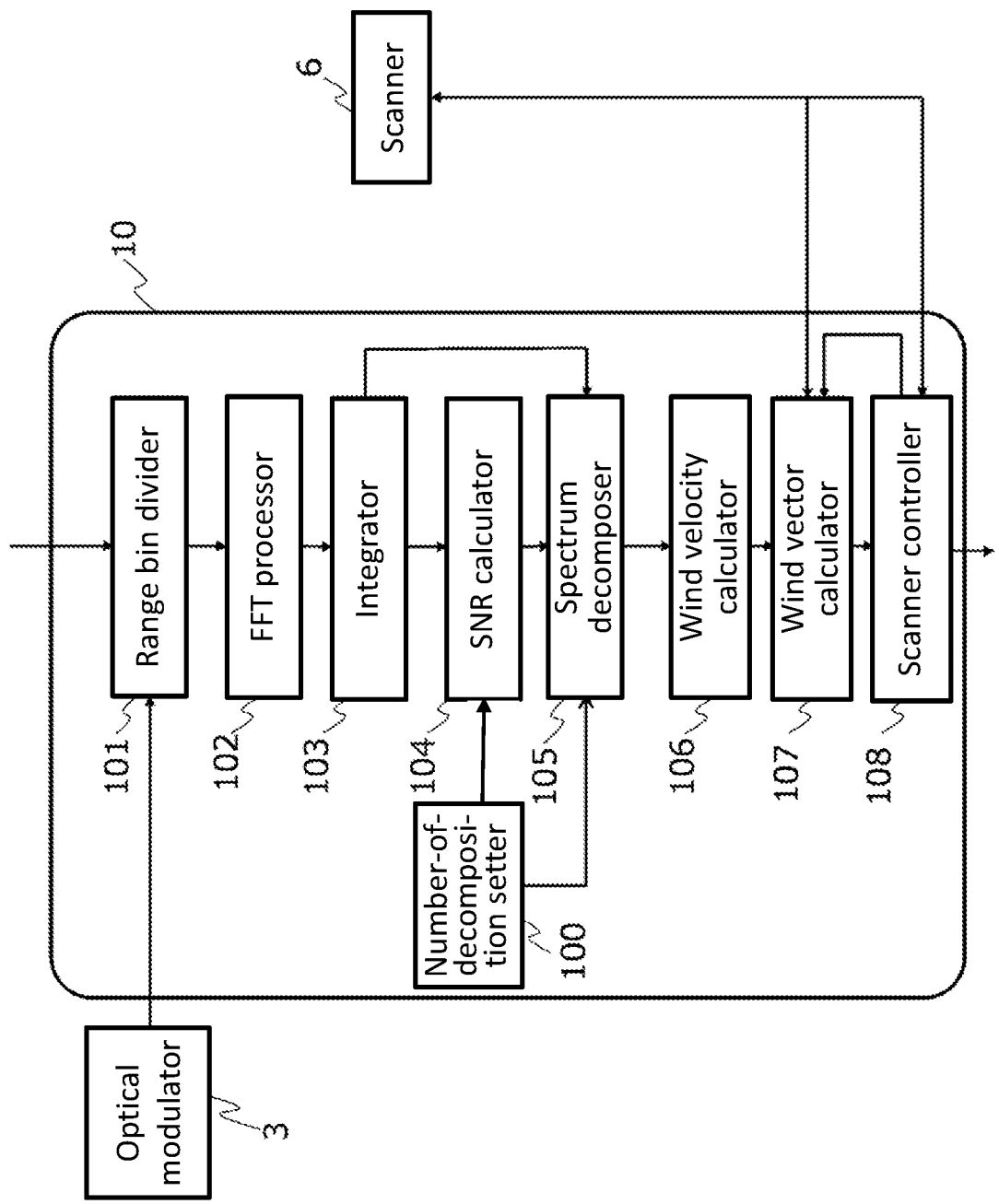
FIG. 2 is a diagram showing a configuration example of a signal processor 10 according to Embodiment 1 of the present invention.

FIG. 2 is a diagram showing a configuration example of the signal processor 10 according to Embodiment 1 of the present invention.

The signal processor 10 includes a number-of-decomposition setter 100, a range bin divider 101, a fast Fourier transform processor (FFT processor) 102, an integrator 103, an SNR calculator 104, a spectrum decomposer 105, a wind velocity calculator 106, a wind vector calculator 107, and a scanner controller 108.

The number-of-decomposition setter 100, which is connected to the SNR calculator 104 and the spectrum decomposer 105, sets the number of decomposition of the spectrum acquired at each range bin. It sends a digital signal representing the set value of the number of decomposition to the SNR calculator 104 and the spectrum decomposer 105.

The range bin divider 101 is a range bin divider to divide the digital signal data which is an output of the A/D converter 9 into a given number of range bin data. The range bin divider 101 is connected to the A/D converter 9 and the FFT processor 102. The range bin divider 101 divides the digital signal data which is the output of the A/D converter 9 into a given number of range bin data and the output thereof, the divided digital signal data, is fed into the FFT processor 102. To divide signal data into range bin data means to divide signal data at given constant time intervals.

The FFT processor 102 is a FFT processor to perform FFT (Fast Fourier Transform) processing on the signal data which is an output of the range bin divider 101. The FFT processor 102 is connected to the range bin divider 101 and the integrator 103. The FFT processor 102 performs, for each range bin, fast Fourier transform on the signal data which is divided into range bins and each of which is an output of the range bin divider 101, and the output thereof, the converted spectrum signals, are fed into the integrator 103.

The integrator 103 is an integrator to integrate the spectrum signals. The integrator 103 is connected to the FFT processor 102, the SNR calculator 104, and the spectrum decomposer 105. The integrator 103 performs integration processing, a given number of times, on spectrums which are outputs of the FFT processor 102, and the output thereof, the spectrum signal after the integration processing, to the SNR calculator 104 and the spectrum decomposer 105. The integration processing is performed by integrating spectrum signals for the same corresponding range bins over multiple shots.

The SNR calculator 104 derives the SNR function of height from observed SNR values for heights. Then, it defines the height segmentation in each range bin according to the number of decomposition set by the number-of-decomposition setter 100, and sends outputs thereof, SNR values of height segments, to the spectrum decomposer 105.

On the assumption that the spectrum at each height, or range bin, obtained by observation is composed of the spectrums at one or more height segments, where the number of height segments is set by the number-of-decomposition setter 100 and the SNR calculator 104, the spectrum decomposer 105 calculates the spectrum at each height, or height segment, and the calculated spectrums as outputs thereof are fed into the wind velocity calculator 106.

The wind velocity calculator 106 is a wind velocity calculator to calculate the wind velocity from spectrum data. The wind velocity calculator is connected to the spectrum decomposer 105. The wind velocity calculator 106 calculates the Doppler shift of the laser light from the spectrum signal which is an output of the spectrum decomposer 105, and calculates the radial wind velocity of the laser light from the Doppler shift thereof. The wind velocity calculator 106 sends each radial wind velocity to the wind vector calculator 107.

The wind vector calculator 107 is a wind vector calculator to calculate the wind vector from radial wind velocities and angle information of the radial directions thereof. The wind vector calculator 107 is connected to the wind velocity calculator 106, the scanner 6, and the scanner controller 108. The wind vector calculator 107 calculates the wind vector from radial wind velocities which are outputs of the wind velocity calculator 106 and from prism angle information of the scanner 6 acquired through the scanner controller 108, and then the output thereof, the calculated wind vector, is fed into the scanner controller 108.

The scanner controller 108 is a scanner controller to generate control signals to control the scanner 6. The scanner controller 108 is connected to the wind vector calculator 107, the scanner 6, and the display 11. The scanner controller 108 generates control signals to switch radial directions on the basis of the calculation result of the wind vector by the wind vector calculator 107 and then the outputs thereof, the generated control signals, are fed into the scanner 6. The scanner controller 108 holds the angle information acquired from the scanner 6, while it sends the angle information to the wind vector calculator 107. In addition, the scanner controller 108 sends the calculation result of the wind vector which is an output of the wind vector calculator 107 to the display 11.

For the number-of-decomposition setter 100, the range bin divider 101, the FFT processor 102, the integrator 103, the SNR calculator 104, the spectrum decomposer 105, the wind velocity calculator 106, the wind vector calculator 107, and the scanner controller 108, a logic circuit of Field Programmable Gate Array (FPGA), a microcomputer, or the like is used.

Now, the description goes back to the configuration of the laser radar system shown in FIG. 2.

The display 11 is a display to show the radial wind velocity calculated by the signal processor 10. The display 11 is connected to the signal processor 10. The display 11 displays data calculated by the signal processor 10, such as radial wind velocities, the SNRs thereof, or the wind vector. For the display 11, a liquid crystal display, an organic electroluminescent (EL) display, or the like is used. It is possible for the display 11 to include a storage device, such as a Random Access Memory (RAM) or a hard disk, to store radial wind velocities, the SNRs thereof, or wind vectors with their time of day.

Next, the way the laser radar system according to Embodiment 1 of the present invention works is described.

The optical oscillator 1 performs laser light oscillation and sends the laser light by oscillation to the optical coupler 2.

The optical coupler 2 splits the laser light which is the output of the optical oscillator 1 into the transmission light and the local light with a given branching ratio, and then one output thereof, the transmission light, is fed into the optical modulator 3 and the other output, the local light, is fed into the multiplexing coupler 7. The transmission light is light to be emitted into the atmosphere from the optical antenna 5, and the local light is light to be combined with the reception light at the multiplexing coupler 7 in order for the optical receiver 8 to perform heterodyne detection. The branching ratio of the optical coupler 2 is determined by the system design.

For the level calculation in the system design, the following formula is used, for example.

[Formula 1]

$$SNR = P \cdot \beta \cdot K \cdot \frac{\eta_F}{\left(1 + \left(1 - \frac{L}{F}\right)^2 \left[\frac{\pi (A_c D)^2}{4 \lambda L}\right]^2 + \left(\frac{A_c D}{2 S_0}\right)^2\right)} \cdot \left[\frac{\lambda \pi D^2}{8 h B L^2}\right] \sqrt{N} \quad (1)$$

$\beta$, K, and $S_0$ denote a backscattering coefficient ($m^{-1} sr^{-1}$), an atmospheric transmittance, and a coherence diameter of the scattered light (m), respectively, each of which is a parameter representing an atmospheric condition that the system cannot control. D, F, N, and L denote a beam diameter (m), a focus length (m), the number of incoherent integration (times), and a target distance (m), respectively, each of which is a parameter to be determined in the system. h, λ, P, ηF, and B denote the Planck's constant (Js), a wavelength (m), transmission light pulse energy (J), Far Field transmission/reception efficiency, and reception bandwidth (Hz). Ac denotes an approximation coefficient to replace the Gaussian beam that is suffered from optical vignetting by the optical antenna (NGB: Nearest Gaussian Beam) with a Gaussian beam that is highly correlated with NGB and is around the diffraction limit. L denotes a target distance (m). Optical vignetting means a state where a Gaussian beam that is transmitted or received is partly shaded by an edge of the effective aperture of a telescope as if it is clipped there. Ac in the above corresponds to a coefficient to be multiplied by a Gaussian curve, where the Gaussian curve is those that is used when the "clipped" Gaussian beam is fitted by the Gaussian curve.

The optical modulator 3 performs frequency modulation and amplitude modulation on the transmission light split by the optical coupler 2 and sends the modulated transmission light to the optical circulator 4. The optical modulator 3 determines the pulse width and the pulse repetition frequency (PRF) of the transmission light. Indeed, the pulse width determines the range measurement ambiguity. Hence, it is possible for the signal processor 10 to set therein a pulse width corresponding to the desired range measurement ambiguity and to set the pulse width to the optical modulator 3. Alternatively, it is possible for the optical modulator 3 to use the fixed pulse width and the fixed PRF that are both set at the designing phase. In case the output light level from the optical modulator 3 is not sufficient, it is possible to add an optical amplifier at the next stage of the optical modulator 3. The optical modulator 3 sends pulse trigger signals, indicating pulse timings to pulse the transmission light, to the A/D converter 9.

The transmission light modulated by the optical modulator 3 passes through the optical circulator 4 and is fed into the optical antenna 5. The reception light received by the optical antenna is fed into the multiplexing coupler 7 as an output of the optical circulator 4. In this way, the optical circulator 4 isolates the reception light from the transmission light.

The optical antenna 5 makes the transmission light collimated and emits it into the atmosphere. Also, the optical antenna 5 focuses the scattered light of the transmission light from the aerosol and receives it as the reception light. It is possible for the optical antenna 5 to have a focus controlling mechanism.

The scanner 6 rotates the wedge prism by receiving control signals which are outputs of the signal processor 10 to control, as desired, the direction of the light which is emitted from the optical antenna 5. Also, the scanner 6 sends electric signals corresponding to encoder information to the signal processor 10, thereby giving the angle information.

The multiplexing coupler 7 combines the local light which is an output of the optical coupler 2 with the reception light which is an output of the optical circulator 4, and the output thereof, the combined light, is fed into the optical receiver 8.

The optical receiver 8 converts the combined light which is the output of the multiplexing coupler 7 into an electric signal, performs frequency demodulation on it by heterodyne detection, and the output thereof, the frequency-demodulated reception signal, is fed into the A/D converter 9.

After receiving the pulse trigger signal generated at the optical modulator 3, the A/D converter 9 performs A/D conversion on the reception signal which is the output of the optical receiver 8 at sampling frequency fs, and the output thereof, digital signal data thereof, to the signal processor 10.

Here, the operation of the signal processor 10 is described.

Figure 3:
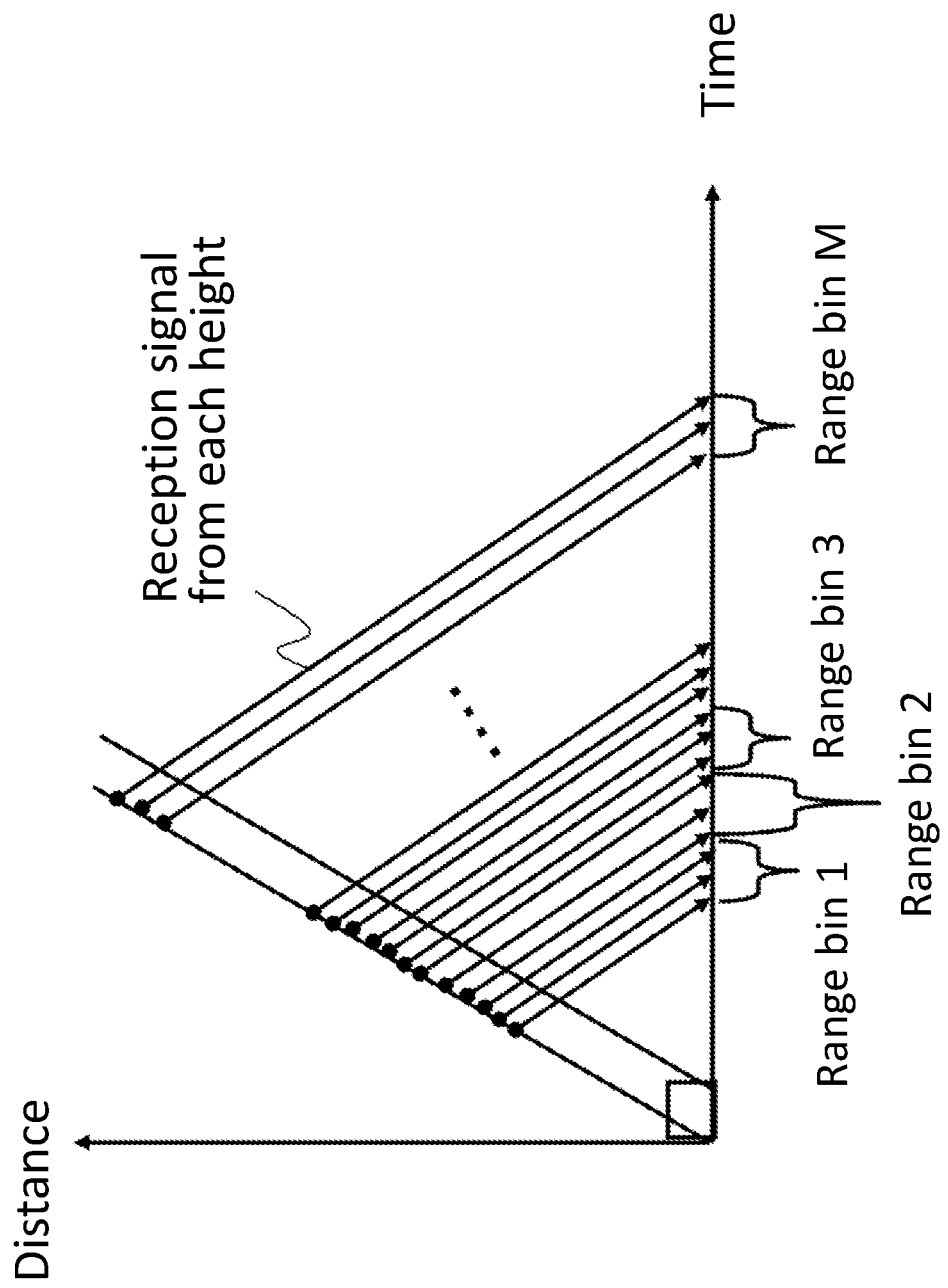
FIG. 3 is an illustration showing a relationship between target distance and reception time in the laser radar system according to Embodiment 1 of the present invention.

FIG. 3 is an illustration showing a relationship between target distance and reception time in the laser radar system according to Embodiment 1 of the present invention. The range bin divider 101 divides the reception signal data from various distances at given time intervals. Hereinafter, each divided time duration (time gate) is referred to as a range bin. The time duration of a range bin corresponds to the range measurement ambiguity. The range bin divider 101 divides the received waveform into a given number of range bins and sends the voltage values of a received waveform during a range bin to the FFT processor 102.

For example, when the range measurement ambiguity is represented by Rres, the time interval (t) to divide an A/D converted time domain waveform is represented by t=2 Rres/c (c: speed of light). Therefore, when the total number of range bins is M, the times at which the waveform data is divided into range bins are expressed as the following formulae with a reference timing of a trigger signal to start A/D conversion, where the trigger signal here is a trigger signal from the optical modulator 3.

[Formula 2]

$$Tstart(m) = (m-1)\left(\frac{Rres}{c}\right) + 2Rmin/c \quad (2)$$

[Formula 3]

$$Tend(m) = (m+1)\left(\frac{Rres}{c}\right) + 2Rmin/c \quad (3)$$

[Formula 4]

$$Tcen(m) = (m)\left(\frac{Rres}{c}\right) + 2Rmin/c \quad (4)$$

Tstart is the data acquisition start time for each range bin; Tend is the data acquisition end time for each range bin; and m is the range bin number, which varies from 1 to M. Rmin is a value to control the distance for starting observation, or the time delay from the pulse trigger signal to the start timing of the A/D conversion represented in the distance dimension. When the delay from the trigger to the start of the A/D conversion is 0, or in a case where the measurement is going to be started from, for example, 40 meters, Rmin is set to be 40.

Although all the range bins here have equal time durations, this is not a limitation. It is possible for a user to decide a distance for starting observation, which corresponds to Tstart, or it is possible to determine the values for each range bin. Furthermore, it is possible to decide Tstarts and Tends so as for the time duration of one range bin to overlap with that of another range bin.

The FFT processor 102 performs FFT processing on a time domain waveform of each range bin acquired by the range bin divider 101 at FFT bin number (NFFT) points, and obtains a reception signal spectrum. NFFT means the number of points at which the FFT processing is performed, where the typical number is 256, for example.

The integrator 103 performs incoherent integration on the spectrums obtained at shots for the number of times (N) designated by the user. The incoherent integration is performed on spectrum data of each range bin using the following formula.

Figure 4:
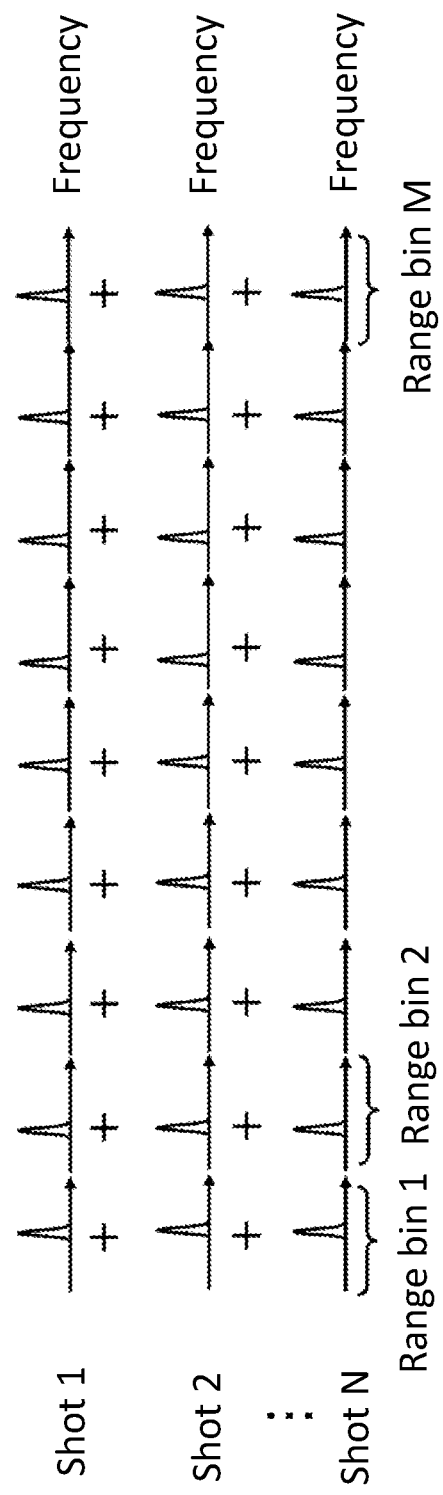
FIG. 4 is a conceptual diagram showing integration processing of an integrator 103 according to Embodiment 1 of the present invention.

FIG. 4 is a conceptual diagram showing the integration processing of the integrator 103 according to Embodiment 1 of the present invention. The integrator 103 performs the integration processing by adding up spectrum data of range bins with the same range bin number, regarding spectrum data of range bins in a plurality of shots. The integration processing is expressed as the following formula.

[Formula 5]

$$S(i, R) = \left(\sum_{n}^{N} SPC(i, n, R)\right) / N \qquad (5)$$

SPC (i, n, R) is spectrum data at each shot, S (i, R) is spectrum data after the integration processing, i is a frequency bin number, n is a shot number, and R is a range bin number. By performing the integration processing, the peak value (signal value) of the spectrum data becomes large compared to noise values. In other words, the SNR is improved.

Figure 5:
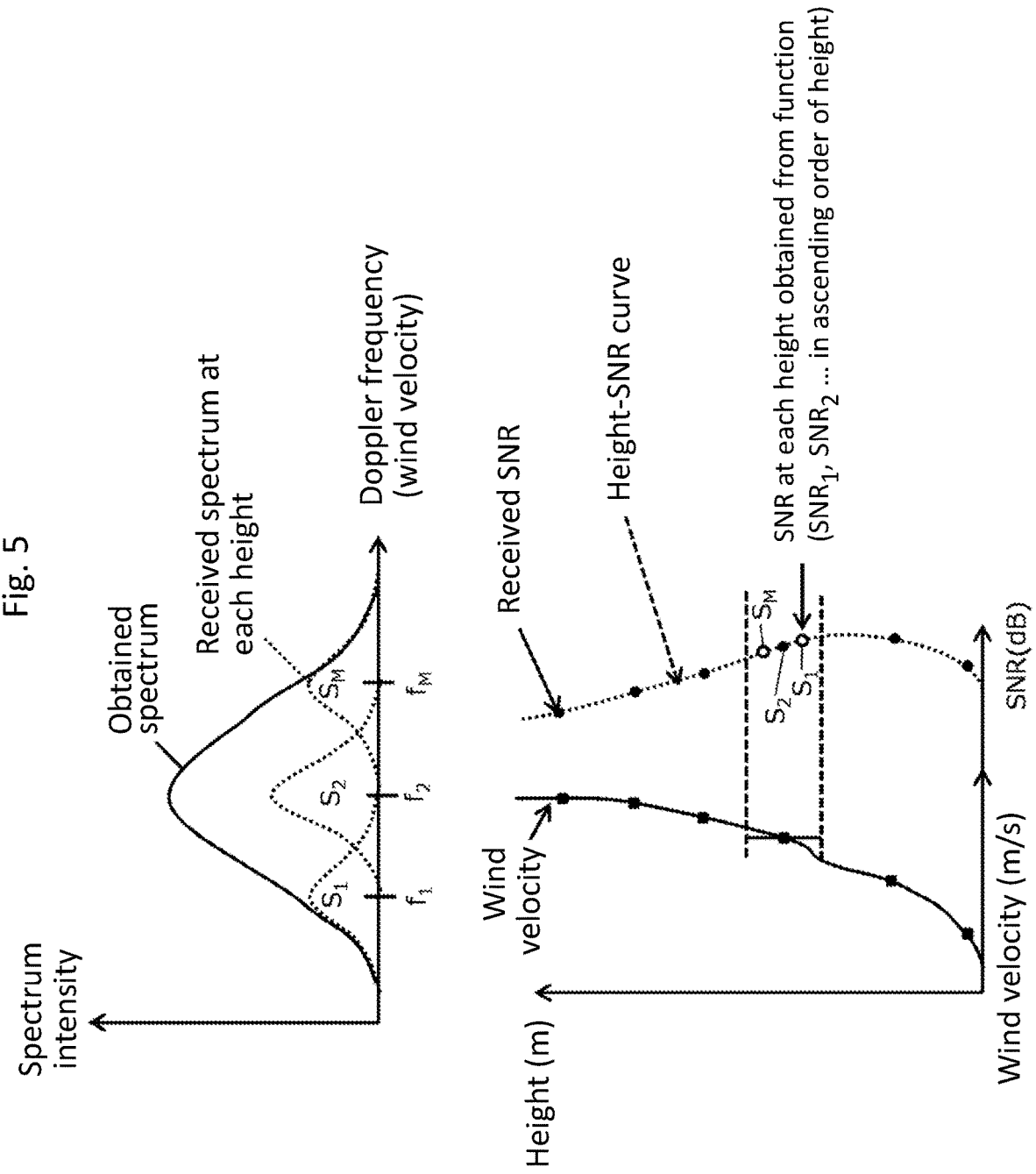
FIG. 5 includes conceptual diagrams showing ideas concerning processes in an SNR calculator 104 and a spectrum decomposer 105 according to Embodiment 1 of the present invention.

FIG. 5 includes conceptual diagrams showing ideas concerning processes in the SNR calculator 104 and the spectrum decomposer 105 according to Embodiment 1 of the present invention. In upper FIG. 5, solid line represents an obtained spectrum at a certain range bin, where this spectrum is formed as the superposition of spectrums $S_1$ to $S_M$ each represented by dotted lines in FIG. 5. In this example figure, the spectrum is decomposed into three components according to their heights. The SNR calculator 104 derives SNRs at heights represented by white small circles in lower FIG. 5. At that time, it is possible to apply a polynomial approximation with observed SNRs (black small circles in lower FIG. 5). It is also possible to use the level calculation formula shown as formula (1): by regarding the backscattering coefficient as a parameter, for example, the parameter value that makes the formula fit most the obtained SNR profile should be derived so as to apply the formula (1) function to derive SNRs of required heights. To obtain an SNR from a measured value, the peak value of the spectrum is divided by the noise floor value.

The spectrum decomposer 105 performs parameter estimation of the decomposed spectrum mentioned above. When Stotal, the spectrum to be decomposed, is the summation of $S_1, S_2 \ldots S_M$, it is expressed as the following formula. Here, Stotal corresponds to S (i, R) in Formula (5). Each fi (Doppler frequency) is the parameter to be obtained. It is possible here to perform the method of maximum likelihood, but it requires enormous amount of computation because of a large number of parameters, such as amplitude coefficients, Doppler frequencies, and spectrum widths σ. Using the present configuration is effective in reducing the amount of computation because amplitude coefficients are derived from SNR profiles.

[Formula 6]

$$S_{total}(f) = S(i, R) = \sum_{1}^{M} A_i g_i(f_i, \sigma) \qquad (6)$$

[Formula 7]

$$g_i = \exp\left(-\frac{(f - f_i)^2}{2\sigma^2}\right) \qquad (7)$$

[Formula 8]

$$\sigma = \sqrt{w_t^2 + w_L^2} \qquad (8)$$

Here, $w_t$ is a line width of transmission light, $w_L$ is a line width of local light, M is the number of height segments into which the spectrum is to be decomposed, f is a frequency, i is a serial number to identify decomposed segments of the spectrum (refer to FIG. 5), and fi is a spectrum center value (mean) of each height segment.

As shown in Formula (9), the spectrum decomposer 105 normalizes Stotal with its maximum value. Also, as shown in Formula (10), the spectrum decomposer 105 calculates the amplitude coefficient A of each Gaussian waveform by normalizing a received SNR.

[Formula 9]

$$S'_{total} = \frac{S_{total}}{\text{MAX}(S_{total})} \qquad (9)$$

[Formula 10]

$$A_i = SNR_i / \left(\sum_{j=1}^{M} SNR_j\right) \qquad (10)$$

With Stotal in Formula (6) substituted with S'total in Formula (9) and with Ai in Formula (6) substituted with Ai in Formula (10), the simultaneous equations (system of equations whose number is that of decomposed segments) are solved to determine each fi. As a result, the values of $f_1$ to $f_M$ are derived. Unlike a fitting such as maximum likelihood method, since spectrums for multiple height segments are calculated by solving the simultaneous equations after obtaining amplitude coefficient terms from the SNR profile, reduction of computation amount is achieved as described above. Here, the Stotal is discrete data whose data point intervals depend on a given frequency resolution. Then the obtained spectrum should be converted into a function by performing Gaussian fitting or polynomial approximation. The use of the polynomial approximation has an advantage of flexibility to apply even to a spectrum of a complex shape, so that it is possible to improve the wind velocity measurement accuracy.

Figure 6:
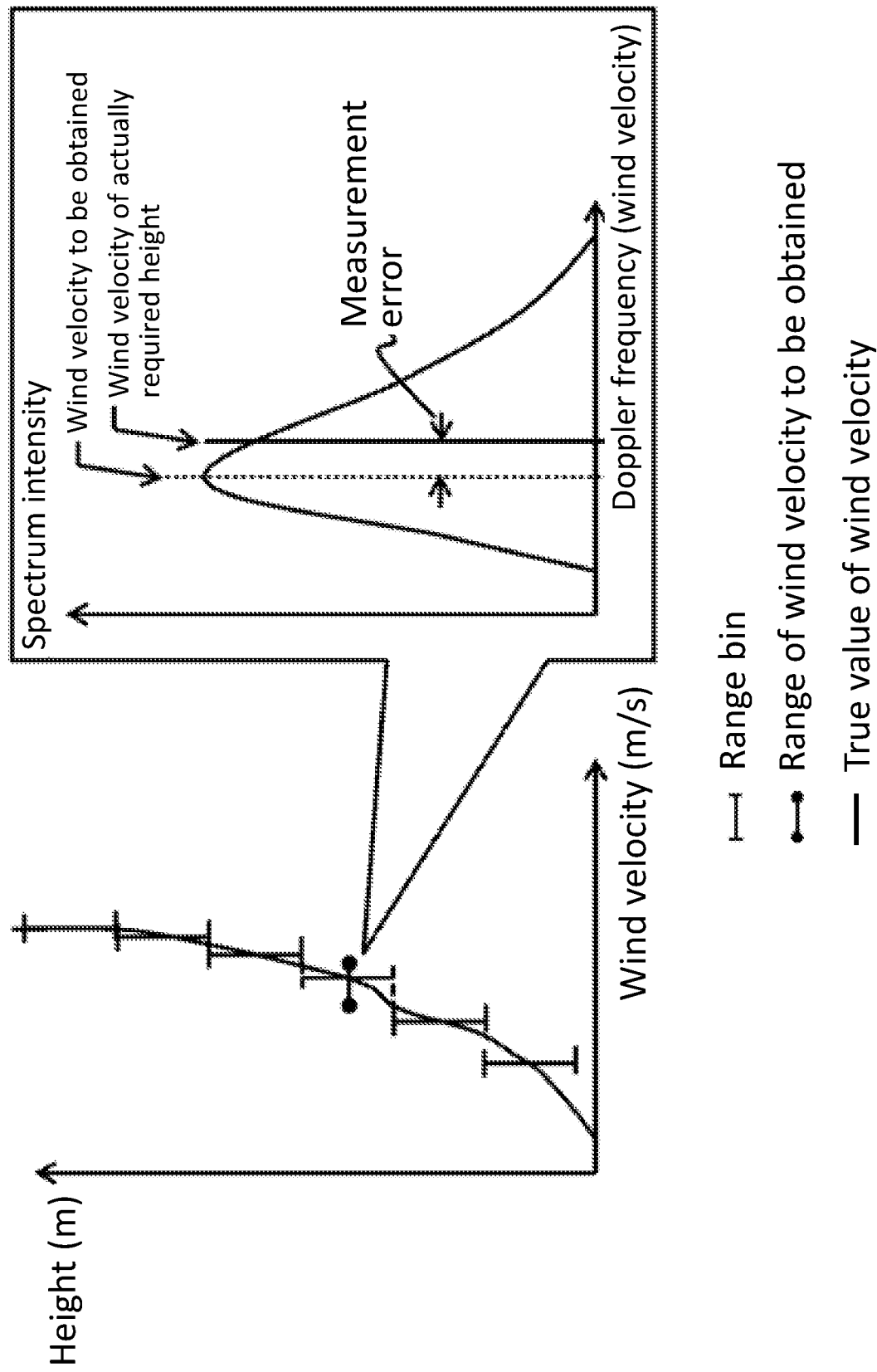
FIG. 6 is a diagram showing a relation model between wind velocity values and their heights to be measured in the laser radar system according to Embodiment 1 of the present invention.

FIG. 6 is a diagram showing a relation model between wind velocity values and their heights to be measured in the laser radar system according to Embodiment 1 of the present invention. In general, wind velocity typically obeys the power law for the height dependence thereof, while minute fluctuations do exist. Therefore, the wind velocity in each range bin does not increase linearly. For constant aerosol distribution, obtained spectrums show their peaks at their respective mode values. Here, the model shows a case where the wind shear exists at a height lower than the center of the range bin. In this case, measurement error occurs for the wind velocity at the center. Hence, even when the wind velocity is calculated through linear interpolation according to its height, observation error occurs because of the non-linearity of the wind velocity. To solve these problems with the present configuration, the spectrum is decomposed to enhance height resolution and to minimize the spectrum measurement ambiguity due to its width. By doing this, it is possible to lower the influence of the wind shear, so that the measurement accuracy is improved.

The wind velocity calculator 106 calculates the Doppler frequency, or the wind velocity in the radial direction from the integrated spectrum. The radial wind velocity v (m/s) is calculated by the following formula. λ denotes the wavelength.

[Formula 11]

$$v = \frac{\lambda \cdot f_i}{2} \quad (11)$$

The wind vector calculator 107 calculates the wind vector by vector addition or by VAD (Velocity Azimuth Display) method. In vector addition, a radial wind velocity (Vr) is expressed, for example, by the following formula using horizontal wind velocity (U) in "east-west" direction, horizontal wind velocity (V) in "north-south" direction, vertical wind velocity (W), elevation angle (θ), and azimuth angle from due north (φ).

[Formula 12]

$$Vr = U \sin \phi \sin \theta + V \cos \phi \sin \theta + W \cos \theta \quad (12)$$

In a case when, for example, three radial wind velocities are given, U, V, and W can be calculated by solving the system of equations. Hence, the three-dimensional wind vector is to be obtained.

The scanner controller 108 generates control signals for the scanner to operate in order to steer the radial direction. In the scanner 6, the internal stepping motor is driven by the control signals from the scanner controller 108. With its designed steps of operation, the scanner steers the direction by a desired angle. Also, the scanner 6 sends angle signals by the equipped encoder to the scanner controller 108. The scanner controller 108 holds the angle information after the steering operation.

The display 11 stores, in a memory, information, such as radial wind velocities, SNRs associated with the radial wind velocities, and the wind vector, etc., which are calculated by the signal processor 10, and displays them.

As described above, according to Embodiment 1 of the present invention, since amplitude coefficient values of the spectrum in a time gate are determined according to SNR values and the spectrum in the time gate is decomposed by using these amplitude coefficient values of the spectrum, the wind velocity measurement accuracy is improved.

Note that, in the present configuration, the description is based on the premise that the laser radar system is a pulse radar system. But this is not a limitation. It is possible to use a CW (Continuous Wave) radar system. In the present configuration, the description on optical connection is based on the optical fiber connections. However, it is possible to use the space propagation type for the connection instead of the optical fiber connections.

Also configuration of the laser radar system does not necessarily have to include a scanner as described above. It is possible to include an optical switch, instead of the scanner between the circulator and the telescope, where these are not limitations. For the optical switch in this case a mechanical optical switch or a MEMS (Micro Electro Mechanical Systems) optical switch, which are for communication use, is to be used, for example.

Also, function of each component of the signal processor 10 may be executed either by hardware, such as FPGA, or by software, which is a program, stored in a memory, that realizes the function of the component, for a processor to read out and execute.

Embodiment 2

In Embodiment 2, a laser radar system which, unlike Embodiment 1, dynamically changes the number into which a spectrum is decomposed is described. The advantage of this configuration is to reduce detection errors due to insufficient SNRs. Generally, as the number of decomposition of a spectrum increases, peak value levels of decomposed spectrums decrease, and this leads to a deterioration of SNRs since the peak levels become lower than the noise floor level.

Figure 7:
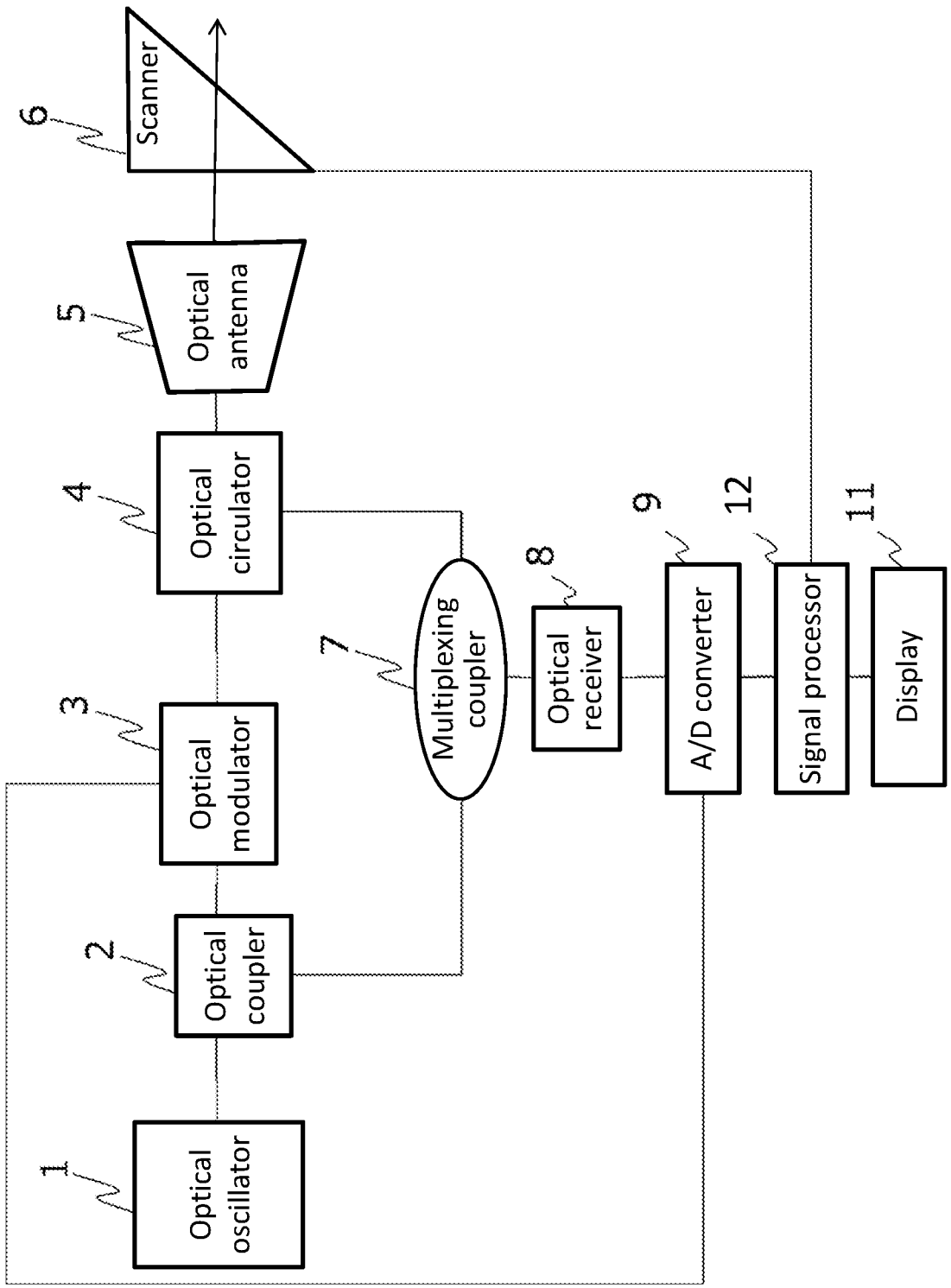
FIG. 7 is a diagram showing a configuration example of a laser radar system according to Embodiment 2 of the present invention.

FIG. 7 is a diagram showing a configuration example of a laser radar system according to Embodiment 2 of the present invention. In FIG. 7, the same reference sign as that in FIG. 1 represents the same or equivalent component whose description is omitted. Configuration of a signal processor 12 is not the same as that of the signal processor 10 in Embodiment 1.

Figure 8:
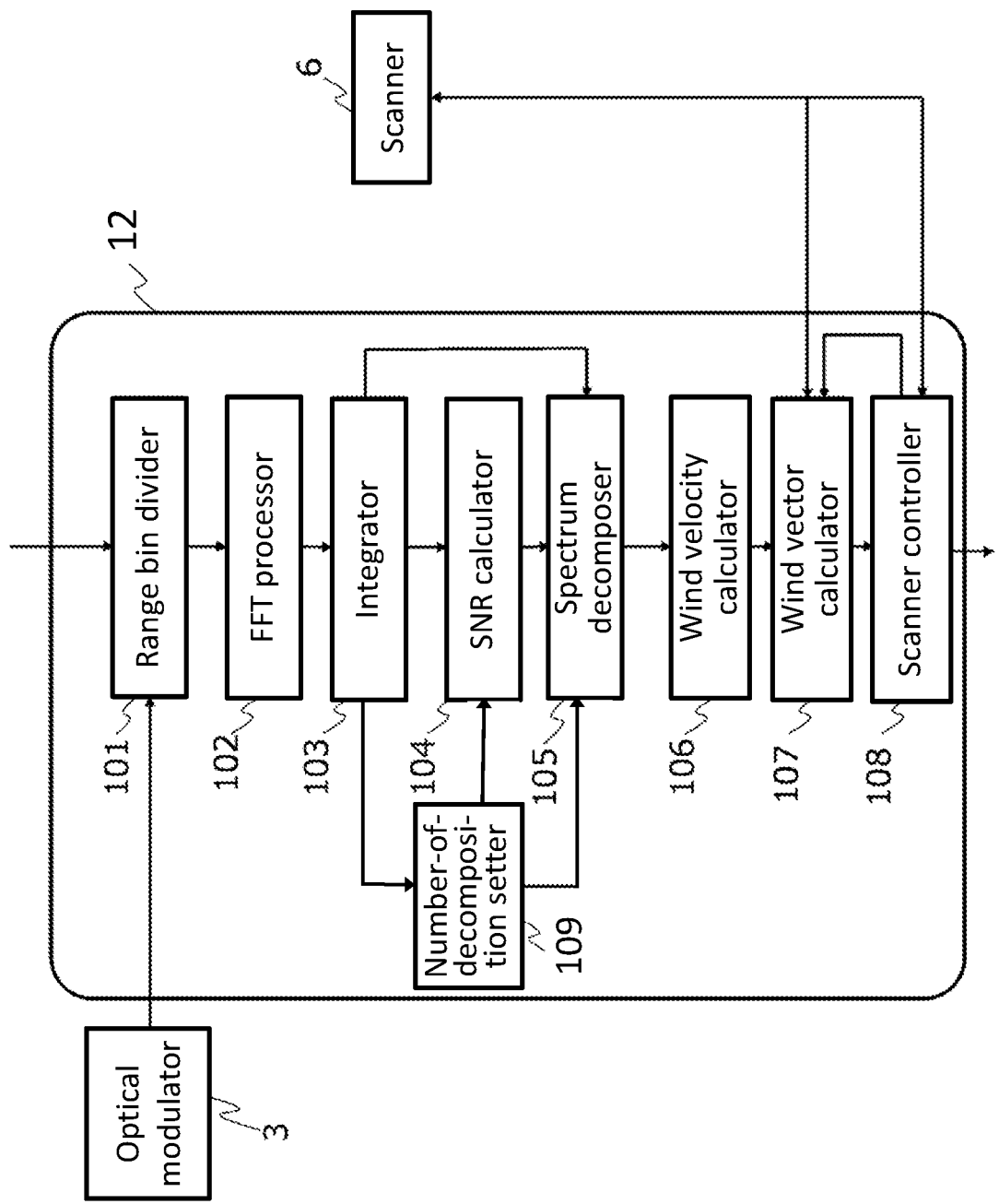
FIG. 8 is a diagram showing a configuration example of a signal processor 12 according to Embodiment 2 of the present invention.

FIG. 8 is a diagram showing a configuration example of the signal processor 12 according to Embodiment 2 of the present invention. Most of the processor configuration is the same as that in FIG. 2. In FIG. 8, the same reference sign as that in FIG. 2 represents the same or equivalent component whose description is omitted.

The signal processor 12 includes the range bin divider 101, the FFT processor 102, the integrator 103, the SNR calculator 104, the spectrum decomposer 105, the wind velocity calculator 106, the wind vector calculator 107, and the scanner controller 108. The spectrum obtained in the integrator 103 is fed into a number-of-decomposition setter 109 and the number-of-decomposition setter 109 sends the maximum possible segment number for the spectrum to be decomposed to the SNR calculator 104 and the spectrum decomposer 105, where these are the points different from those of the signal processor 10.

Next, the way the laser radar system according to Embodiment 2 of the present invention works is described. Descriptions of operations that are the same as those in Embodiment 1 are omitted. Only the operations that differ from those in Embodiment 1 are described.

Since the operations of the optical oscillator 1 through the A/D converter 9 are the same as those in Embodiment 1, the description thereof are omitted.

The number-of-decomposition setter 109 in the signal processor 12 calculates the peak SNR, which shows the highest value, from the spectrum data received from the integrator 103. Regarding this peak SNR, when the SNR threshold for signal detection is represented by TH, a segment number M that satisfies the following formula is derived. Here, M is a natural number.

[Formula 13]

$$M < \frac{SNR}{TH} \quad (13)$$

At this time, by choosing a threshold that is higher than the usual signal detection threshold to have a margin, it becomes possible to ensure good wind velocity measurement accuracy.

Figure 9:
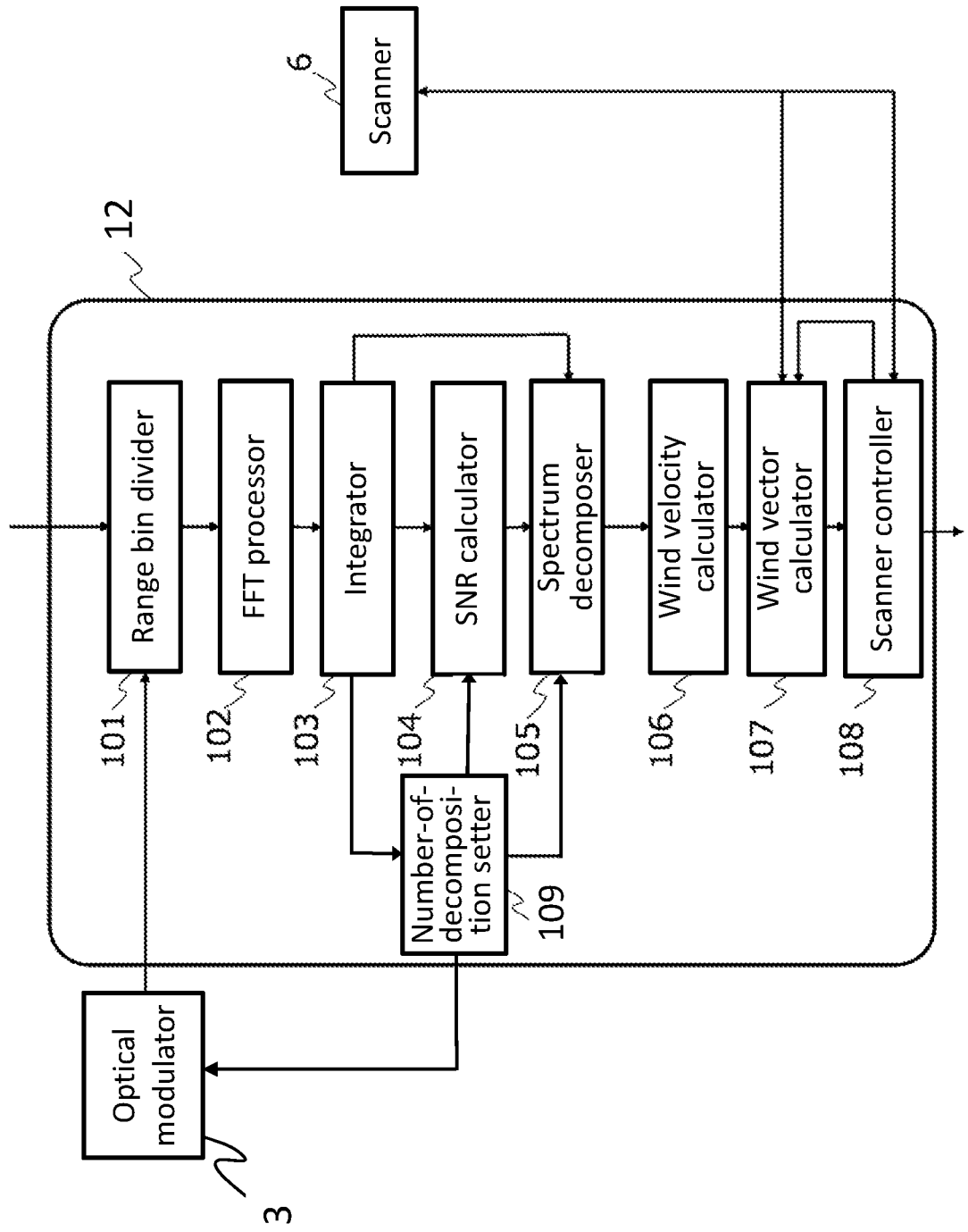
FIG. 9 is a diagram showing another configuration example of the signal processor 12 according to Embodiment 2 of the present invention.

FIG. 9 is a diagram showing another configuration example of the signal processor 12 according to Embodiment 2 of the present invention. If M is smaller than 1, a signal to change the time gate width and the pulse width of the transmission light may be sent, as shown in FIG. 9, to the optical modulator 3. The range bin divider 101 changes the time gate width in accordance with the control signal from the optical modulator 3. Thus, the SNR is improved.

Figure 10:
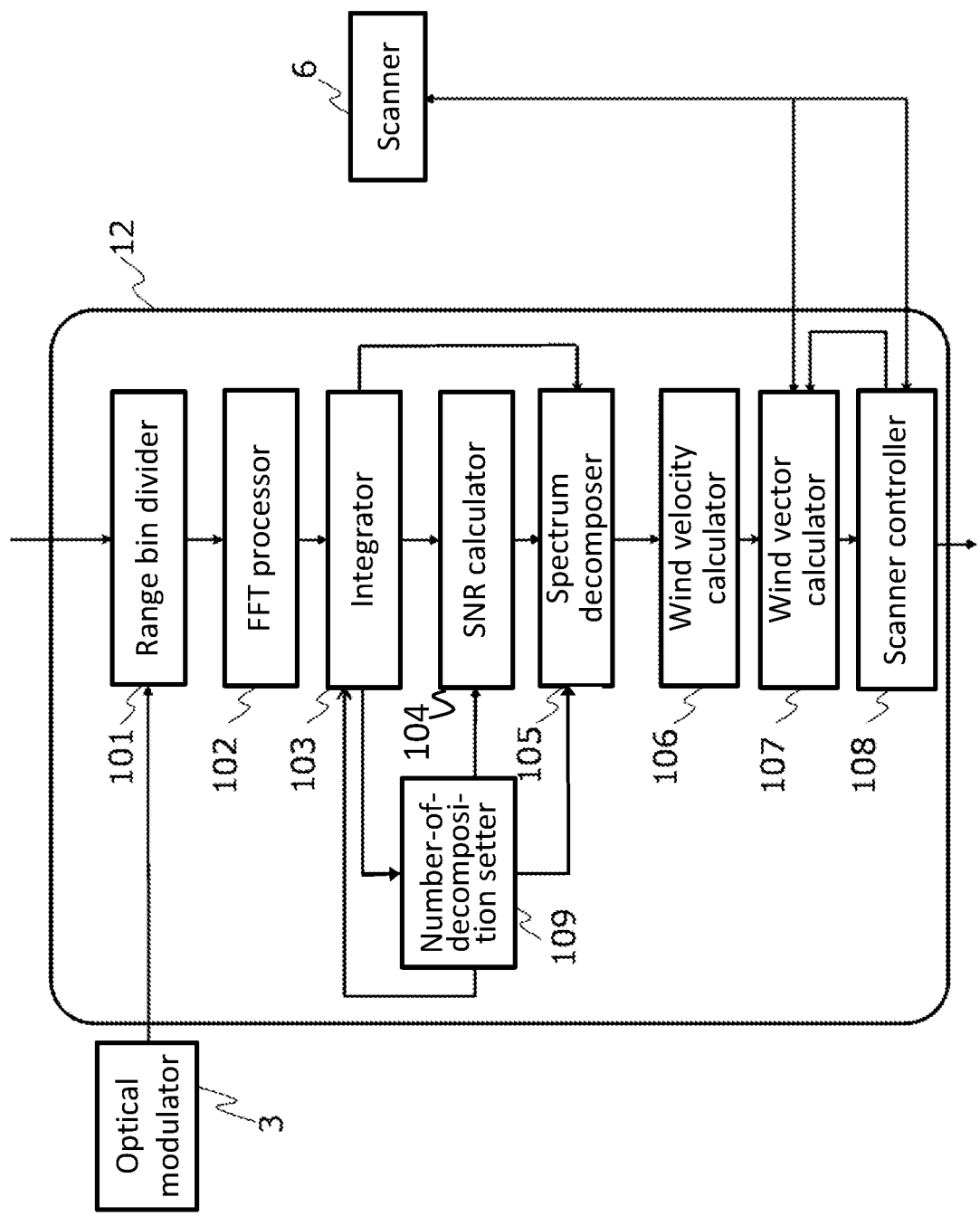
FIG. 10 is a diagram showing a third configuration example of the signal processor 12 according to Embodiment 2 of the present invention
Figure 11:
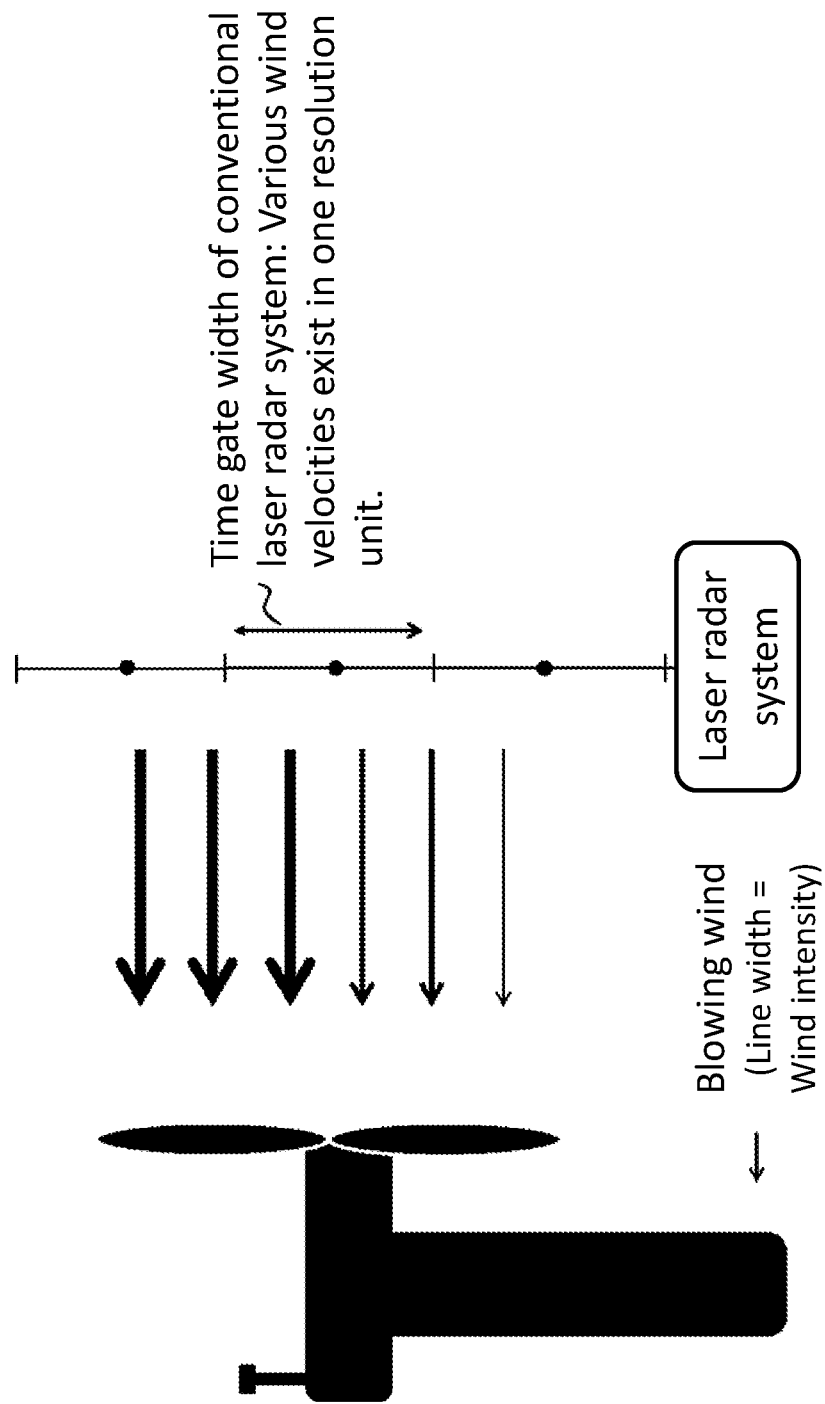
FIG. 11 is an illustration showing wind turbine evaluation using a conventional radar system.

FIG. 10 is a diagram showing a third configuration example of the signal processor 12 according to Embodiment 2 of the present invention. If M is smaller than 1, a setting signal to make the integrator increase the number of integration times may be sent as shown in FIG. 10. As shown above, by setting a system parameter so as to make the observation possible using the obtained SNR as a decision criterion, the effective data ratio is improved.

As described above, according to Embodiment 2 of the present invention, the number of decomposed spectrums is dynamically changed, so that the measurement error due to insufficient SNR is reduced.

REFERENCE SIGNS LIST

1: optical oscillator, 2: optical coupler, 3: optical modulator, 4: optical circulator, 5: optical antenna, 6: scanner, 7: multiplexing coupler, 8: optical receiver, 9: A/D converter, 10: signal processor, 11: display, 12: signal processor, 100: number-of-decomposition setter, 101: range bin divider, 102: FFT processor, 103: integrator, 104: SNR calculator, 105: spectrum decomposer, 106: wind velocity calculator, 107: wind vector calculator, 108: scanner controller, 109: number-of-decomposition setter

The invention claimed is:

1. A laser radar system, comprising:
an optical oscillator to perform laser light oscillation;
an optical modulator to modulate the laser light by oscillation of the optical oscillator;
an optical antenna to emit the laser light modulated by the optical modulator into the atmosphere and to receive scattered light from an irradiated target as reception light;
an optical receiver to perform heterodyne detection on the reception light received by the optical antenna; and
a signal processor to calculate a spectrum of a reception signal obtained by the optical receiver's performing heterodyne detection, to decompose the spectrum using signal-to-noise ratios, and to calculate a velocity of the irradiated target from a decomposed spectrum, wherein the signal processor comprises:
a range bin divider to divide the reception signal at intervals of a preset width of time gates;
a Fourier transform processor to perform Fourier transform on a reception signal divided by the range bin divider and to calculate a spectrum of the reception signal for each of the time gates;
an integrator to integrate spectrums calculated by the Fourier transform processor for each of the time gates;
a Signal-to-Noise Ratio (SNR) calculator configured to obtain a signal-to-noise ratio for a target distance from the spectrum integrated by the integrator;
a number-of-decomposition setter to set the number of segments for the spectrum integrated by the integrator to be decomposed;
a spectrum decomposer to decompose the spectrum integrated by the integrator by using the number of segments set by the number-of-decomposition setter and the signal-to-noise ratios calculated by the SNR calculator; and
a wind velocity calculator to calculate a wind velocity of the irradiated target from a spectrum decomposed by the spectrum decomposer.

2. The laser radar system according to claim 1, wherein the number-of-decomposition setter determines the number of segments for the spectrum to be decomposed by using a threshold for the signal-to-noise ratio.

3. The laser radar system according to claim 2, wherein the integrator changes the number of integration times of spectrums according to the number of segments.

4. The laser radar system according to claim 2, wherein the range bin divider changes, according to the number of segments, the width of the time gates which is used when the spectrum is calculated.

5. The laser radar system according to claim 2, wherein the optical modulator changes, according to the number of segments, a pulse width which is used when the laser light is modulated.

* * * * *